United States Patent [19]

Kurtz et al.

[11] Patent Number: 5,147,757
[45] Date of Patent: Sep. 15, 1992

[54] OPTICALLY TRANSPARENT POLYMER ALLOY AND ITS USE IN MOLDING MATERIALS, MOLDINGS, FILMS, COATINGS, ADHESIVES AND PHOTOSENSITIVE RECORDING ELEMENTS

[75] Inventors: Karl-Rudolf Kurtz, Heidelberg; Horst Koch, Gruenstadt; Thomas Telser, Weinheim, all of Fed. Rep. of Germany

[73] Assignee: BASF Aktiengesellschaft, Ludwigshafen, Fed. Rep. of Germany

[21] Appl. No.: 759,979

[22] Filed: Sep. 17, 1991

Related U.S. Application Data

[62] Division of Ser. No. 476,938, Feb. 8, 1990, abandoned.

[30] Foreign Application Priority Data

Feb. 25, 1989 [DE] Fed. Rep. of Germany ....... 3905947

[51] Int. Cl.$^5$ ................ G03C 1/74; C08L 23/26; B32B 27/28
[52] U.S. Cl. .................. 430/270; 430/271; 430/281; 430/287; 430/286; 522/109; 522/110; 525/193; 525/211; 525/218; 525/221; 524/522
[58] Field of Search ............ 525/221, 193; 430/270; 522/109, 110

[56] References Cited

U.S. PATENT DOCUMENTS

| | | | |
|---|---|---|---|
| 3,264,272 | 8/1966 | Rees | 260/78.5 |
| 3,410,928 | 11/1968 | Baum | 525/221 |
| 3,454,676 | 7/1969 | Busse | 525/221 |
| 4,139,654 | 12/1978 | Herman et al. | 525/227 |
| 4,302,557 | 11/1981 | Yoshimura et al. | 525/221 |
| 4,332,655 | 6/1982 | Berijka | 525/221 |
| 4,371,583 | 2/1983 | Nelson | 525/221 |
| 4,877,663 | 10/1989 | Kambe et al. | 525/221 |
| 4,888,391 | 12/1989 | Domine et al. | 525/221 |
| 4,965,319 | 10/1990 | Kawanoto | 525/221 |

FOREIGN PATENT DOCUMENTS

| | | | |
|---|---|---|---|
| 0115190 | 8/1984 | European Pat. Off. | |
| 2341462 | 2/1974 | Fed. Rep. of Germany | |
| 55-073738 | 6/1980 | Japan | 525/221 |
| 59-008739 | 1/1984 | Japan | 525/221 |
| 60-053547 | 3/1985 | Japan | 525/221 |
| 1298732 | 12/1972 | United Kingdom | |
| 1358062 | 6/1974 | United Kingdom | |
| 1386794 | 3/1975 | United Kingdom | |

*Primary Examiner*—Carman J. Seccuro

[57] ABSTRACT

A novel optically transparent polymer alloy comprises
A) at least one elastomer which contains ethylene and propylene as copolymerized units and
B) at least one elastomer which contains ethylene and (meth)acrylic acid as copolymerized units, and is used as a molding material or for the production of molding materials, moldings, films, coatings, adhesives and photosensitive recording elements.

8 Claims, No Drawings

OPTICALLY TRANSPARENT POLYMER ALLOY AND ITS USE IN MOLDING MATERIALS, MOLDINGS, FILMS, COATINGS, ADHESIVES AND PHOTOSENSITIVE RECORDING ELEMENTS

This application is a division of application Ser. No. 07/476,938 filed on Feb. 8, 1990 now abandoned.

The present invention relates to a novel optically transparent polymer alloy comprising at least two elastomers, both of which contain ethylene as copolymerized units. The present invention furthermore relates to the use of this novel optically transparent polymer alloy as a molding material or for the production of molding materials, moldings, films, coatings, adhesives and photosensitive recording elements. The present invention also relates to a novel photosensitive recording element for the production of relief printing plates which contains the novel optically transparent polymer alloy as a binder in its photopolymerizable relief-forming recording layer.

Elastomers which contain ethylene and propylene and may contain alkadienes as copolymerized units are known and some of them are commercially available. They are generally known as EPM or EPDM rubbers. Because of their saturated polymer main chain, they are similar in some respects to the paraffinic hydrocarbons, i.e. they are completely or substantially nonpolar. They are therefore difficult to mix with polar or less nonpolar functional additives, such as olefinically unsaturated monomers which can be subjected to free radical polymerization or photopolymerization, photopolymerization initiators, plasticizers or dyes, and it is for this reason that these functional additives can be added only in very small amounts, since, owing to their incompatibility, they would otherwise be exuded from the elastomer. Consequently, the mechanical properties of the products produced from these mixtures are often unsatisfactory. To increase the compatibility or the miscibility of polar functional additives with the elastomers, the latter have been modified by maleation, addition of mercapto-containing carboxylic acids, epoxidation, bromination or chlorination. The common feature of all these methods is that they are intended to increase the polarity of the elastomers to a level which permits a sufficient amount of polar functional additives to be mixed in. However, the modification methods all have the disadvantage that, apart from the desired modification, they also result in the formation of crosslinked components which are troublesome even during processing and finally lead to unsatisfactory product properties. Moreover, to carry out the stated modifications, additional process steps have to be performed during the preparation of the elastomers, which is time-consuming and expensive and therefore uneconomical.

Certain progress has been made here through the use of ethylene/propylene/alkadiene terpolymers having an ethylene content of from 40 to 80% by weight and a double bond content of from 2 to 20 olefinic double bonds per 1,000 carbon atoms. As described in German Patent Application P 38 03 457.3, these terpolymers can be mixed with photopolymerizable olefinically unsaturated monomers and photopolymerization initiators. They can therefore be used for the production of photopolymerizable relief-forming recording layers of photosensitive recording materials. However, not all known photopolymerizable olefinically unsaturated monomers can be mixed with these terpolymers in a satisfactory manner; instead, it is necessary to make a narrow choice if particularly suitable photopolymerizable relief-forming recording layers are to be produced. The same applies to the plasticizers which are added to the said recording layers.

Elastomers which contain ethylene and (meth)acrylic acid as copolymerized units are likewise known. For example, reference may be made to DE-A-35 39 469, GB-B-1 386 794, DE-A-21 36 076 or EP-A-0 115 190. It is known that these elastomers can be mixed with epichlorohydrin rubbers and vulcanized (JP-A-59-129255). As disclosed in EP-A-0 293 750, EP-A-0 223 114 and EP-A-0 231 002, they are very suitable as binders in photopolymerizable relief-forming recording layers of photosensitive recording elements.

Nothing has been disclosed to date concerning their miscibility or compatibility with elastomers which contain ethylene and propylene as copolymerized units.

Molding materials, moldings, films, coatings, adhesives and photosensitive recording elements produced using elastomers which contain ethylene and propylene as copolymerized units doubtless have many advantageous properties. For example, German Patent Application P 38 03 457.3 states that the flexographic relief printing plates produced using photopolymerizable relief-forming recording layers containing elastomers of the stated type as binders are particularly resistant to flexographic printing inks containing ketones or ethyl acetate. It is therefore very desirable to overcome the disadvantages of the elastomers containing ethylene and propylene as copolymerized units, without their other advantageous properties being lost but, on the contrary, better technical effect being achieved.

It is an object of the present invention to improve the miscibility of elastomers containing ethylene and propylene as copolymerized units, so that they can be mixed with larger amounts on the one hand and with a greater number, on the other hand, of different functional additives.

We have found that this object is achieved, surprisingly, by the addition of a further elastomer having a different composition. In view of the fact that only a few polymers are compatible with one another to such an extent that they are capable of forming an optically transparent polymer alloy after they have been mixed, the novel achievement of the object was all the more surprising.

The present invention accordingly relates to an optically transparent polymer alloy comprising A) at least one elastomer which contains ethylene and propylene as copolymerized units and B) at least one elastomer which contains ethylene and (meth)acrylic acid as copolymerized units.

The present invention furthermore relates to the use of the novel polymer alloy as a molding material or for the preparation of molding materials, in particular heat-curable and photocurable molding materials. The present invention also relates to the use of the novel polymer alloy for the production of moldings, films, coatings and adhesives.

The present invention furthermore relates in particular to a photosensitive recording element for the production of relief printing plates which contains a photopolymerizable relief-forming recording layer possessing the novel polymer alloy as a binder.

The novel polymer alloy is optically transparent. This means that its components are compatible with one another to such an extent that they can be mixed with one another without turbidity or streaks and do not separate out after preparation of the said alloy.

The novel polymer alloy contains either at least one elastomer (A) and at least one elastomer (B) or consists of these two components. Regardless of whether the novel polymer alloy consists of these two components or contains these two components, the weight ratio of elastomer (A) to elastomer (B) is from 0.1:99.9 to 99.9:0.1, advantageously from 1:99 to 99:1, in particular from 5:95 to 95:5. Within these surprisingly wide ranges, the weight ratio of elastomers (A) and (B) to be used according to the invention can be varied in an advantageous manner and adapted to the particular technical problems and optimized to suit these problems, without there being any risk of a loss of optical transparency of the novel polymer alloy.

The novel polymer alloy contains at least one elastomer (A) as the one essential component. The elastomer (A) to be used according to the invention either consists of copolymerized ethylene and copolymerized propylene or contains further comonomers in addition to these copolymerized monomers. If the elastomer (A) contains further comonomers, it must be ensured that they are of a type, and are present in an amount, such that they do not adversely affect the elastomeric properties.

Suitable elastomers (A) contain from 40 to 80% by weight of copolymerized ethylene. The ethylene content of 80% by weight should not be exceeded here since otherwise, owing to its physicochemical properties, the relevant elastomer (A) is less suitable for synthesis of the novel polymer alloy. On the other hand, the ethylene content should not fall below 40% by weight since otherwise the result will be poorer performance characteristics of the relevant elastomer (A) in this case too. An ethylene content of from 45 to 75% by weight is advantageous because the elastomers (A) having this ethylene content are particularly suitable for the preparation of the novel polymer alloy.

Suitable elastomers (A) contain at least one copolymerized alkadiene. All alkadienes which can be reacted with ethylene and propylene by the conventional and known methods of ethylene copolymerization to give terpolymers are suitable. Conjugated alka-1,4-dienes, such as buta-1,4-diene, isoprene, penta-1,4-diene, hexa-1,4-diene, hepta-1,4-diene, dicyclopentadiene or ethylidenenorbornene, are advantageous here, and dicyclopentadiene, trans-hexa-1,4-diene and ethylidenenorbornene are very particularly advantageous.

The copolymerization of the alkadienes, in particular of the conjugated alka-1,4-dienes, results in a certain proportion of olefinic double bonds in the elastomer (A) to be used according to the invention. The particularly suitable elastomers (A), which contain alka-1,4-dienes as copolymerized units, have a double bond content of from 2 to 20 olefinic double bonds per 1,000 carbon atoms. The olefinic double bonds present in the elastomers (A) are in the main chain of the said elastomers. The double bond content of the elastomers (A) should not fall below two olefinic double bonds per 1,000 carbon atoms if the advantages associated with the copolymerization of alka-1,4-dienes are to be obtained in a reliable manner. On the other hand, the double bond content need not exceed 20 olefinic double bonds per 1,000 carbon atoms because some of the resulting advantages may be lost due to undesirable crosslinking reactions of the olefinic double bonds in the elastomers (A) during their processing. Accordingly, the range from 2 to 20 olefinic double bonds per 1,000 carbon atoms is an optimum within which the double bond content may be varied in a specific manner to meet the particular requirements. Within this optimum range, the range from 4 to 15 olefinic double bonds per 1,000 carbon atoms is noteworthy because it gives rise to a very particularly advantageous technical effect.

Examples of very particularly preferred elastomers (A) are accordingly
ethylene/propylene/dicyclopentadiene,
ethylene/propylene/ethylidenenorbornene,
ethylene/propylene/trans-hexa-1,4-diene,
ethylene/propylene/dicyclopentadiene/ethylidenenorbornene,
ethylene/propylene/dicyclopentadiene/trans-hexa-1,4-diene,
ethylene/propylene/ethylidenenorbornene/trans-hexa-1,4-diene or
ethylene/propylene/ethylidenenorbornene/dicyclopentadiene/trans-hexa-1,4-diene elastomers (A), which contain, as copolymerized units, from 45 to 75% by weight of ethylene and a sufficient amount of the alka-1,4-dienes to give a double bond content of from 4 to 15 olefinic double bonds per 1,000 carbon atoms.

The elastomers (A) described above in detail and to be used according to the invention are known per se and are prepared by the conventional and known processes of ethylene copolymerization.

The other essential component of the novel polymer alloy is at least one elastomer (B) which contains ethylene and (meth)acrylic acid as copolymerized units. The elastomer (B) to be used according to the invention may contain acrylic acid or methacrylic acid or a mixture of these two acids as copolymerized units. Moreover, the elastomer (B) may additionally contain further polymerized comonomers.

Examples of suitable additional comonomers are vinyl esters, such as vinyl acetate, vinyl propionate, vinyl butyrate, vinyl valerate and vinyl hexanecarboxylate; vinyl ethers, such as vinyl prop-1-yl ether, vinyl but-1-yl ether, vinyl but-2-yl ether and vinyl pent-1-yl ether; (meth)acrylates, such as methyl acrylate, methyl methacrylate, ethyl acrylate, ethyl methacrylate, propyl acrylate, propyl methacrylate, n-butyl acrylate, n-butyl methacrylate, n-pentyl acrylate, n-pentyl methacrylate, n-hexyl acrylate, n-hexyl methacrylate, tert-butyl acrylate, cyclohexyl acrylate, cyclohexyl methacrylate, 2-ethylhexyl acrylate, 2-ethylhexyl methacrylate, dicyclopentadienyl acrylate, ω-methylpoly(ethylene oxide)-α-yl (meth)acrylate, ω-methylpoly(propylene-1,2-oxide)-α-yl (meth)acrylate, ω-methylpoly(propylene-1,3-oxide)-α-yl (meth)acrylate; and (meth)acrylamides, such as N-ethylacrylamide, N-methyl-N-butylmethacrylamide and N-ethyl-N-(2-ethylhexyl)-acrylamide. Among these, vinyl acetate, vinyl but-1-yl ether, n-butyl acrylate, 2-ethylhexyl acrylate, ω-methylpoly(ethylene oxide)-α-yl acrylate and dicyclopentadienyl acrylate are very suitable.

The elastomers (B) to be used according to the invention, in particular those which contain the above-mentioned additional comonomers as copolymerized units, may contain olefinically unsaturated and/or polar side groups. Elastomers (B) of this type are described in DE-A-36 02 472 (EP-A-0 231 002).

The elastomers (B) in particular those which contain the additional comonomers as copolymerized units, may also be in the form of adducts with cyclic and/or acyclic amines. Elastomers of this type are disclosed in DE-A-37 18 447 (EP-A-0 293 750).

The elastomers (B) may furthermore be in the form of salts of metal cations or in the form of hydrazinium salts.

If the elastomers (B) contain the abovementioned olefinically unsaturated and/or polar side groups, the cyclic and/or acyclic amines and/or the metal or hydrazinium cations, their amount should be chosen so that the optical transparency of the novel polymer alloy is not adversely affected.

Particularly suitable elastomers (B) which contain additional polymerized comonomers consist of from 30 to 70% by weight of copolymerized ethylene, from 5 to 40% by weight of copolymerized (meth)acrylic acid and from 5 to 50% by weight of at least one of the abovementioned additional comonomers.

Examples of very particularly suitable elastomers (B) are those which contain ethylene and (meth)acrylic acid and additionally n-butyl acrylate, 2-ethylhexyl acrylate and/or ω-methylpoly(ethylene oxide)-α-yl acrylate in the abovementioned amounts as copolymerized units.

The elastomers (B) to be used according to the invention are known per se and can be prepared by the LDPE (=low density polyethylene) high pressure polymerization method at from 200° to 400° C. and under a pressure of more than 800 kg/cm$^2$ (cf. DE-B-23 41 462, US-A-3 264 272 or DE-A-35 39 469).

In terms of the method, preparation of the novel optically transparent polymer alloy has no special features but is carried out by the conventional and known methods for the preparation of polymer blends using the conventional and known mixing, kneading, extrusion and dissolution techniques.

The novel optically transparent polymer alloy has many particular advantages.

For example, it can be prepared in a simple manner and used directly as a molding material. In particular, however, it can be mixed with many completely different functional additives, even in large amounts, without the optical transparency of the novel polymer alloy being lost as a result. Another additional advantage is that the incorporated functional additives do not separate out in the course of time. The novel optically transparent polymer alloy thus has a range of applications which would not have been thought possible in the light of the disadvantages of the elastomers (A), mentioned at the outset. The novel optically transparent polymer alloy is therefore very useful for the preparation of molding materials, in particular of heat-curable and photocurable molding materials. Furthermore, the said polymer alloy is very suitable for the production of photocurable or heat-curable adhesives. It is also suitable for the production of moldings, films and coatings, which are particularly optically transparent, resilient and resistant to chemical and physical influences.

Examples of suitable functional additives which may be advantageously mixed with the novel optically transparent polymer alloy are conventional and known plasticizers, olefinically unsaturated monomers which can be subjected to free radical polymerization, photopolymerizable olefinically unsaturated monomers, initiators for free radical thermal polymerization, photopolymerization initiators, thermal polymerization inhibitors, dyes, pigments, sensitometric regulators, crosslinking agents, tackifiers, antioxidants, antiozonants, fillers, reinforcing fillers, flow improvers or mold release agents. They are added to the novel optically transparent polymer alloy in effective amounts, their choice depending on the intended use of the resulting mixture containing the novel optically transparent polymer alloy.

An example of an intended use for which the stared optically transparent molding materials are particularly suitable is the production of the photopolymerizable relief-forming recording layer of photosensitive recording elements which are used especially for the production of relief printing plates, in particular flexographic ones. For this purpose, the novel optically transparent polymer alloy is mixed with the functional additives, such as those which are known and conventionally used for this purpose, and the mixture is formed into the photopolymerizable relief-forming recording layer, after which the latter is exposed imagewise and then developed with a suitable developer. The functional compounds stated in German Patent Application P 38 03 457.3, DE-A-37 18 447 (EP-A-0 293 750), DE-A-35 40 950 (EP-A-0 223 114), DE-A-36 02 472 (EP-A-0 231 002), DE-A-29 42 183, DE-A-21 38 582 or DE-A-24 56 439 can be used in the amounts described there, together with the other conventional and known components of a photosensitive recording element, such as dimensionally stable substrates, flexible and resilient under-layers, adhesion-promoting layers, intermediate layers, top layers or cover sheets. The flexographic relief printing plates thus obtained have advantages which are attributable directly to the use of the novel optically transparent polymer alloy, such as high resistance to printing ink solvents containing ketones or ethyl acetate and to ozone, excellent resilience and abrasion resistance and outstanding quality of reproduction.

EXAMPLES AND COMPARATIVE EXPERIMENTS

EXAMPLES 1 TO 3

Preparation of novel optically transparent polymer alloys; experimental method:

To carry out Examples 1 to 3, in each case 100 g of the EPDM rubber Buna ® AP 251 from Hüls GmbH (ethylene content: 50% by weight; double bond content: 14 double bonds per 1,000 carbon atoms; elastomer A) were dissolved in 300 g of toluene. 5 g (Example 1), 10 g (Example 2) and 20 g (Example 3) of the ethylene/acrylic acid/ω-methylpoly(ethylene oxide)-α-yl acrylate elastomer (B) according to Example 1 of DE-A-35 39 469 were added to these three solutions. The three homogeneous solutions were poured onto polyethylene terephthalate films with the aid of a manual caster. The resulting wet layers gave transparent flexible films of satisfactory quality after drying for six hours at 70° C.

EXAMPLES 4 TO 6

Preparation of novel optically transparent polymer alloys; experimental method:

Examples 1 to 3 were repeated, except that, instead of the abovementioned elastomer (B), the ethylene/acrylic acid/n-butyl acrylate elastomer (B) modified by a polymer-analogous reaction with glycidyl methacrylate, according to Example 1 of DE-A-36 02 472 (EP-A-0 231 002), was used. The films obtained here were transparent, flexible and satisfactorily formed.

EXAMPLES 7 TO 12

Preparation of novel optically transparent polymer alloys; experimental method:

The amounts of elastomers (A) and (B) stated in Examples 1 to 6 were mixed without solvents at 120° C. with the addition of 0.5 g of tert-butyl-p-cresol (inhibitor of free radical thermal polymerization or crosslinking) in each case in a kneader (Brabender) and then pressed to give 0.7 mm thick sheets. All these sheets were completely transparent and flexible and had satisfactory surface quality.

COMPARATIVE EXPERIMENTS V1 AND V2

Preparation of conventional polymer alloys; experimental method:

To carry out Comparative Experiments V1 and V2, in each case 100 g of the elastomers (A) used in the preceding Examples 1 to 12 (Buna ® AP 251 from Hüls GmbH) were dissolved in 300 g of toluene. 10 g of the EPDM rubber Buna ® AP 447 from Hüls GmbH (ethylene content: 70% by weight; double bond content: 8 double bonds per 1,000 carbon atoms; elastomer A), in Comparative Experiment V1, and 10 g of a conventional and known styrene/isoprene/(styrene, butadiene) three-block copolymer, in Comparative Experiment V2, were added to the resulting solutions. The solutions obtained were poured onto polyethylene terephthalate films with the aid of a manual caster. The wet layers obtained were dried for six hours, after which only opaque films which had surface defects and were of nonuniform thickness and inhomogeneous composition were obtained, the said films being completely useless both for optical purposes and for conventional applications of elastomers (A). It was particularly surprising here that even the chemically closely related elastomers (A), each of which is capable of forming the novel optically transparent polymer alloys with the elastomers (B), were virtually completely incompatible with one another.

EXAMPLE 13

Preparation of a novel optically transparent heat-curable molding material; experimental method:

A mixture of 90 g of the elastomer (A) according to Examples 1 to 3 and 10 g of the elastomer (B) according to Examples 1 to 3, 10 g of hexane-1,6-diol diacrylate and 2 g of dicumyl peroxide were dissolved in 300 g of toluene, and the solution was applied to a polyethylene terephthalate film with the aid of a manual caster. The wet layer was dried to give a heat-curable film, from which none of the components were exuded even after a period of three months and which therefore remained completely dry on its surface. After the film had been heated for 15 minutes at 160° C., a uniformly flexible sheet which could be bent without material failure was obtained.

COMPARATIVE EXPERIMENT V3

Preparation of a conventional heat-curable molding material; experimental method:

Example 13 was repeated, except that the addition of the elastomer (B) was omitted. The heat-curable film of this Comparative Experiment had a film of moisture on its surface, which film, according to IR spectroscopic investigations, consisted of exuded hexane-1,6-diol diacrylate. Furthermore the film did not adhere to the polyethylene terephthalate film. After the film had been heated for 15 minutes at 160° C., a sheet was obtained which, when bent, developed fine cracks in the surface, the said cracks continuing into the more flexible material underneath. This showed that the sheet obtained in this manner was neither homogeneous in composition nor uniformly flexible.

EXAMPLE 14

Production of a novel photosensitive recording element and further processing of the latter to give flexographic printing plates; experimental method:

A mixture of 80 g of the elastomer (A) of Examples 1 to 3, 12.5 g of dihydrodicyclopentadienyl acrylate, 4 g of dioctyl adipate (Plastomoll DOA), 3 g of benzil dimethyl acetal, 1 g of tert-butyl-p-cresol, 5 g of the elastomer (B) of Examples 1 to 3, 0.005 g of Rhodamine B (C.I. 45,170), 0.01 g of Duasyn Basic Red (C.I. 50,240) and 0.25 g of the potassium salt of N-nitrosocyclohexylhydroxylamine were dissolved in 130 ml of a mixture of toluene and tetrahydrofuran in a volume ratio of 5.5 : 1, and the resulting solution was applied to a 75 μm thick polyethylene terephthalate film coated with an alcohol-soluble polyamide. The wet layer was dried to give a 700 μm thick novel photopolymerizable relief-forming recording layer, which was laminated on its free side with a 125 μm thick polyethylene terephthalate film coated with a polyurethane adhesive. Thereafter, the polyethylene terephthalate film was removed from the alcohol-soluble polyamide layer, which remained on the photopolymerizable relief-forming recording layer. A standard negative was then placed on the polyamide layer, and the photopolymerizable relief-forming recording layer was exposed imagewise to actinic light through the said negative. After the imagewise exposure, the unexposed and therefore nonphotopolymerized parts of the imagewise exposed relief-forming recording layer were developed with perchloroethylene in a cylindrical brush washer, dried and then postexposed to actinic light.

This gave a flexographic relief printing plate having a relief layer which exactly corresponded to the transparent parts of the standard negative and had very good shadow well depths. The flexographic relief printing plate was clamped on a printing cylinder and used in a flexographic printing unit for continuous flexographic printing with flexographic printing inks containing ethyl acetate. The said printing plate had a long press life.

EXAMPLE 15

Production of a novel photosensitive recording element and further processing of the said element to give a flexographic relief printing plate; experimental method:

A mixture of 80 g of the elastomer (B) of Examples 4 to 6, 3.5 g of N-butyl-N-(2-hydroxyethyl)-amine, 5.5 g of dihydrodicyclopentadienyl diacrylate, 11 g of the elastomer (A) of Examples 1 to 3, 1 g of benzil dimethyl acetal, 0.5 g of tert-butyl-p-cresol, 1 g of the potassium salt of N-nitrosocyclohexylhydroxylamine, 0.02 g of Duasyn Basic Red (C.I. 50,240) and 0.006 g of Basazol Red 71 P (C.I. 45,170) were dissolved in 100 g of toluene and processed by the method stated in Example 14 to give a photosensitive recording element, which was exposed imagewise by the method stated in Example 14. After the imagewise exposure, the photosensitive recording element was developed with 1% strength aqueous sodium carbonate solution, dried and then postexposed to actinic light. In the production of the flexographic relief printing plate, it was found that the photopolymerizable relief-forming recording layer of the photosensitive recording element had excellent exposure properties. The relief layer of the flexographic relief printing plate showed a weight increase of only 7.8% by weight in a printing ink solvent mixture consisting of ethanol and ethyl acetate in a volume ratio of 7 : 3. The flexographic relief printing plate was used for continuous flexographic printing, as described in Example 14. It gave more than 250,000 excellent high-contrast copies in a print run.

We claim:

1. A photosensitive recording element for the production of relief printing plates, containing a dimensionally stable substrate and a photopolymerizable relief-forming recording layer consisting essentially of
   (i) at least one optically transparent polymer alloy comprising
      A) at least one elastomer which contains ethylene and propylene as a copolymerized units and
      B) at least one elastomer which contains ethylene and (meth)acrylic acid as copolymerized units, as a polymeric binder and
   (ii) at least one photopolymerizable olefinically unsaturated monomer and
   (iii) at least one photopolymerization initiator.

2. A photosensitive recording element as defined in claim 1, wherein the elastomer (A) contains from 40 to 80% by weight of copolymerized ethylene.

3. A photosensitive recording element as defined in claim 1, wherein the elastomer (A) contains copolymerization alkadienes.

4. A photosensitive recording element as defined in claim 1, wherein the elastomer (A) has a double bond content of from 2 to 20 olefinic double bonds per 1,000 carbon atoms.

5. A photosensitive recording element as defined in claim 1, wherein the elastomer (B) contains at least one polymerized comonomer selected from the group consisting of the vinyl esters, vinyl ethers, (meth)acrylates and (meth)acrylamides.

6. A photosensitive recording element as defined in claim 5, wherein the elastomer (B) consists of
   $b_1$) from 30 to 70% by weight of copolymerized ethylene,
   $b_2$) from 5 to 40% by weight of copolymerized (meth)acrylic acid and
   $b_3$) from 5 to 50% by weight of at least one polymerized comonomer selected from the group consisting of the vinyl esters, vinyl ethers, (meth)acrylates and (meth)acrylamides.

7. A photosensitive recording element as defined in claim 5, wherein the elastomer (B) contains side groups which have olefinically unsaturated and/or polar groups.

8. A photosensitive recording element as defined in claim 1, wherein the weight ratio of elastomer (A) to elastomer (B) is form 0.1:99.9 to 99.9:0.1.

* * * * *